F. SMITH.
Side Saddle.

No. 105,734. Patented July 26, 1870.

United States Patent Office.

FENWICK SMITH, OF AUSTIN, TEXAS.

Letters Patent No. 105,734, dated July 26, 1870.

IMPROVED SIDE-SADDLE.

The Schedule referred to in these Letters Patent and making part of the same.

*To all whom it may concern:*

Be it known that I, FENWICK SMITH, of Austin, in the county of Travis and State of Texas, have invented a new and useful Improvement in Side-Saddles; and I do hereby declare that the following is a full, clear, and exact description thereof, which will enable others skilled in the art to make and use the same, reference being had to the accompanying drawing forming part of this specification.

This invention relates to a new and useful improvement in side-saddles, and consists in forming the saddle-tree hollow, or with air-chambers therein, and in the construction and arrangement of parts as hereinafter described.

In the accompanying drawing—

Similar letters of reference indicate corresponding parts.

Figure 1:
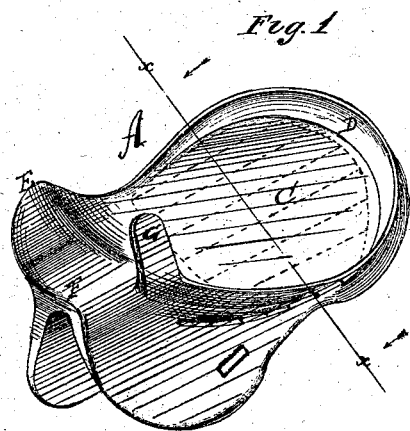
Figure 1 represents a perspective view of a side-saddle constructed according to my invention.
Figure 2:
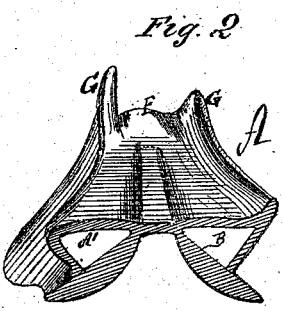
Figure 2 is a cross-section of fig. 1 on the line $x\ x$, looking in the direction of the arrows.

This is a full-seated side-saddle tree, and is made hollow or with air-chambers.

A is the tree.

A' and B are air-chambers on each side of the seat, the chambers being formed by springing tough pieces of wood on each side to extend up as high as the seat is intended to be, and then putting on the top C, of suitable form, for a comfortable seat.

D is the back, which extends from the rear to the top of the right horn E.

F is a rest in front of the horns.

G is the left horn.

The entire tree is made of strong, tough wood, covered with raw hide in the most substantial manner. This makes a light and most durable side-saddle, one comfortable to both horse and rider.

By this method of construction springs are formed in the tree for the seat, rendering the latter easy and elastic.

In common side-saddles metallic springs for the seat are often attached to the tree, and are consequently liable to corrode and break, or become displaced.

By my invention the spring is a part of the tree, and not liable to these objections.

This saddle may be finished with soft leather, buckskin, or cloth, in any manner to suit the taste.

Having thus described my invention,

I claim as new and desire to secure by Letters Patent—

The side-saddle tree A, with the air-chambers A' and B, constructed in all respects substantially as herein shown and described.

FENWICK SMITH.

Witnesses:
M. W. TOWNSEND,
SAMUEL WALKER.